(12) United States Patent
Tsai

(10) Patent No.: US 8,601,174 B2
(45) Date of Patent: Dec. 3, 2013

(54) TRIGGERING OPERATION MODE IN VIRTUAL ENVIRONMENT

(75) Inventor: Teng-Yu Tsai, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 219 days.

(21) Appl. No.: 13/236,621

(22) Filed: Sep. 19, 2011

(65) Prior Publication Data

US 2012/0216192 A1    Aug. 23, 2012

(30) Foreign Application Priority Data

Feb. 22, 2011   (TW) .............................. 100105711 A

(51) Int. Cl.
  *G06F 3/00* (2006.01)
  *G06F 13/00* (2006.01)
(52) U.S. Cl.
  USPC ............ 710/16; 710/2; 710/5; 710/8; 710/15

(58) Field of Classification Search
  None
  See application file for complete search history.

(56) References Cited

U.S. PATENT DOCUMENTS

2012/0054744 A1\*  3/2012  Singh et al. ...................... 718/1
2012/0198097 A1\*  8/2012  Cota-Robles et al. ............ 710/5

\* cited by examiner

*Primary Examiner* — Scott Sun
(74) *Attorney, Agent, or Firm* — Altis & Wispro Law Group, Inc.

(57) ABSTRACT

In a computer system, a virtual machine (VM) guest is instantiated on a VM host. The VM host detects a plurality of successive universal serial bus (USB) events occurring in the computer system and compares the plurality of successive USB events to a preset criterion. When the plurality of successive USB events meets the preset criterion, the VM host transmits a request for triggering an operation mode to the VM guest. The VM guest executes a control program for initiating the operation mode in response to the request.

20 Claims, 7 Drawing Sheets

TRIGGERING OPERATION MODE IN VIRTUAL ENVIRONMENT

BACKGROUND

1. Technical Field

The disclosure generally relates to a method and a system for triggering an operation mode in a virtual environment.

2. Description of Related Art

Virtualization is a technique in which a computer system is partitioned into multiple isolated virtual machines (VMs), each of which appears to the software within it to be a complete computer system. A typical virtual system can operate multiple VM guests by installing a VM host with a host operating system (OS) for operating the VM guests. Each VM guest may include a guest OS, which may be unaware of any of the other VM guests even though they are instantiated on the same computer system. The VM host is responsible for providing the environment each VM guest runs and maintaining isolation between the VM guests.

A VM guest may work in one of the two operation modes: a user mode and a factory mode. In the user mode, the VM guest may provide a user environment, in which a user can perform a series of normal operations, such as playing a media file, editing a document, and navigating the Internet. The factory mode is used for operating the VM guest in a process of manufacturing, testing, inspecting, or repairing, to determine the status of the hardware/software of the VM guest. The factory mode is a mode that can execute hidden commands for a power user and may introduce damage to the computer system. Therefore, the factory mode is always forbidden to a normal user. In some practices, the factory mode can only be activated by inputting a password or a key combination. However, neither a password nor a key combination is sufficient to prevent a normal user from entering the factory mode intentionally or accidentally. Therefore, there is room for improvement within the art.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

In general, the word "module" as used herein, refers to logic embodied in hardware or firmware, or to a collection of software instructions, written in a programming language, such as Java, C, or assembly. One or more software instructions in the modules may be embedded in firmware, such as in an EPROM. The modules described herein may be implemented as either software and/or hardware modules and may be stored in any type of non-transitory computer-readable medium or other storage device. Some non-limiting examples of non-transitory computer-readable media include CDs, DVDs, BLU-RAY, flash memory, and hard disk drives.

Figure 1:
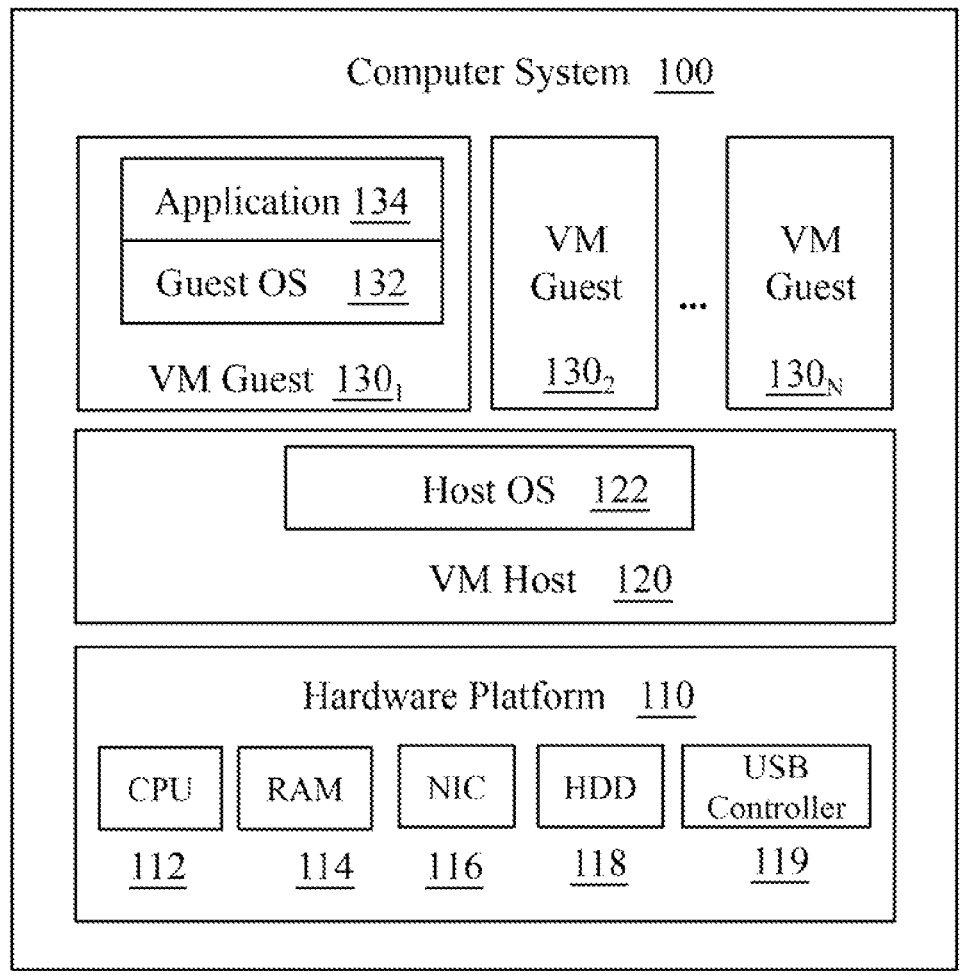
FIG. 1 is a schematic diagram of one embodiment of a computer system in which virtual machines are configured.

FIG. 1 depicts a block diagram of virtual machines configured on a computer system 100. The computer system 100 may be constructed on a desktop, a laptop, or on a server grade hardware platform 110 such as an x86 architecture platform. Such a hardware platform may include a central processing unit (CPU) 112, a random access memory (RAM) 114, a network interface controller (NIC) 116 (also referred to herein as a network card), a hard disk drive (HDD) 118, a universal serial bus (USB) controller 119 and other I/O devices such as a mouse and a keyboard (not shown in FIG. 1). The USB controller 119 may operate as a USB host and communicate with a USB device connected to a USB port so as to transmit/receive data.

The computer system 100 can operate one or more virtual machine (VM) guests $130_1$, $130_2$ ... $130_N$, collectively designated by a reference numeral 130, by installing a VM host 120 with a host operating system (OS) 122 for operating the VM guests 130. Each of the VM guests 130 may include a guest OS and one or more software applications. For example, the VM guest $130_1$ may include a guest OS 132 and an application 134 that is installed and executable in the VM guest $130_1$. In one embodiment, the VM guest $130_1$ may work in one of the two operation modes: a user mode and a factory mode. In the user mode, the VM guest $130_1$ may provide a user environment, in which a user can perform a series of normal operations, such as playing a media file, editing an office document, and navigating the Internet. In the factory mode, the VM guest $130_1$ may provide an engineering environment, in which the user can operate the VM guest $130_1$ in a process of manufacturing, testing, inspecting, or repairing, to determine the status of the hardware/software of the VM guest $130_1$.

The VM host 120 may control the hardware platform 110, present to the VM guest 130 virtualized hardware resources, and manage the VM guests 130. Multiple instances of the VM guests 130 may share the virtualized hardware resources and each of them may execute programs as if it was a physical machine. Each of the VM guests 130 may have access to a set of physical devices. The VM host 120 may control which physical devices are assigned to each of the VM guests 130, and implements the devices that are visible to the VM guests 130.

The computer system 100 may assign a unique Internet protocol (IP) address for each of the VM guests 130 manually or automatically. The computer system 100 may create an Address Resolution Protocol (ARP) table that stores and maintains IP addresses of the VM guests 130. The ARP table may further store a VM ID or an MAC address to mark a unique IP address for each VM guest. The VM ID is an identification key to identify a unique VM guest. The VM host 120 assigns the MAC address when the corresponding VM guest is created. Each of the VM guests 130 has a unique MAC address, which can be recognized in a local area network (LAN) or a wide area network (WAN) such as the Internet. The IP address of a VM guest can be acquired from the ARP table according to either the VM ID or the MAC address of the VM guest.

The VM host 120 may establish a connection channel based on transmission control protocol (TCP) between the VM host 120 and each of the VM guests 30. For example, when a connection channel is established between the VM host 120 and the VM guest 130₁, the VM host 120 and the VM guest 130₁ can communicate with each other.

Figure 2:
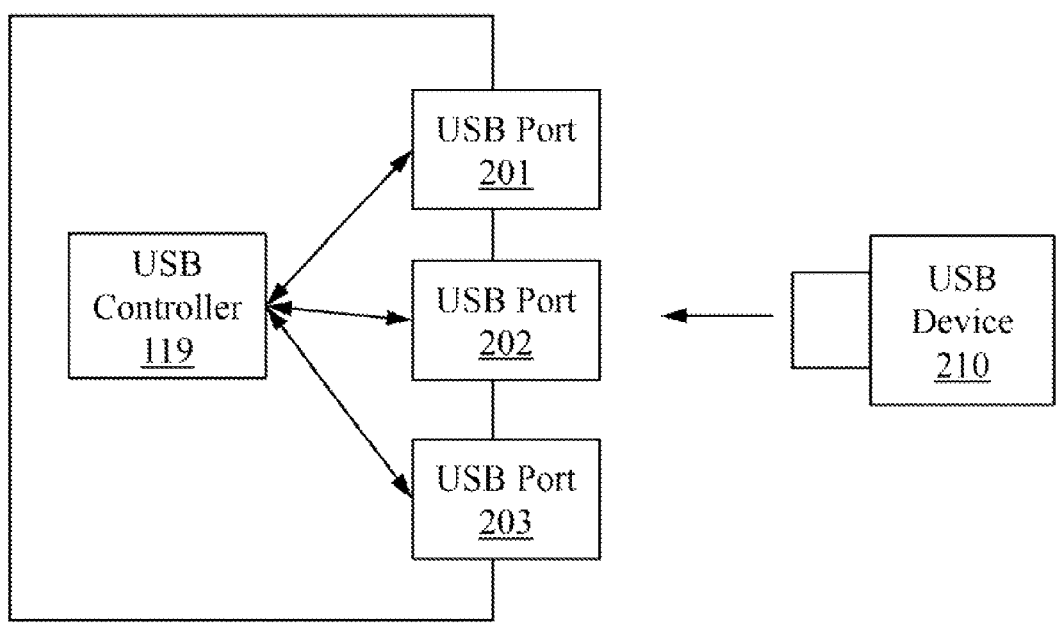
FIG. 2 illustrates a schematic diagram of one embodiment of universal serial bus (USB) interfaces of the computer system of FIG. 1.

In FIG. 2, a schematic diagram of USB interfaces of the computer system 100 is illustrated. The USB controller 119 provides USB ports 201-203. Each of the USB ports 201-203 may provide a USB interface to which a USB device 210 may be connected.

When the USB device 210 is either plugged into or unplugged from one of the USB ports 201-203, a corresponding USB event will be detected by the VM host 120. The USB device 210 can be any electronic device with a USB interface, such as a USB webcam, a USB TV card, a USB hard disk drive, or a USB keyboard.

The VM host 120 may monitor the USB ports 201-203 and detect a plurality of successive USB events, each of which occurs on one of the USB ports 201-203. The successive USB events may include at least one USB plug event and at least one USB unplug event. The VM host 120 may determine whether the detected USB events meet a preset criterion, which may be stored in the HDD 118. If the VM host 120 determines that the detected USB events meet the preset criterion, the VM host 120 may transmit a request for triggering the factory mode to one of the VM guests 130, for example the VM guest 130₁. When the VM guest 130₁ receives the request, the VM guest 130₁ may execute a control program for initiating the factory mode of the VM guest 130₁.

Figure 3:
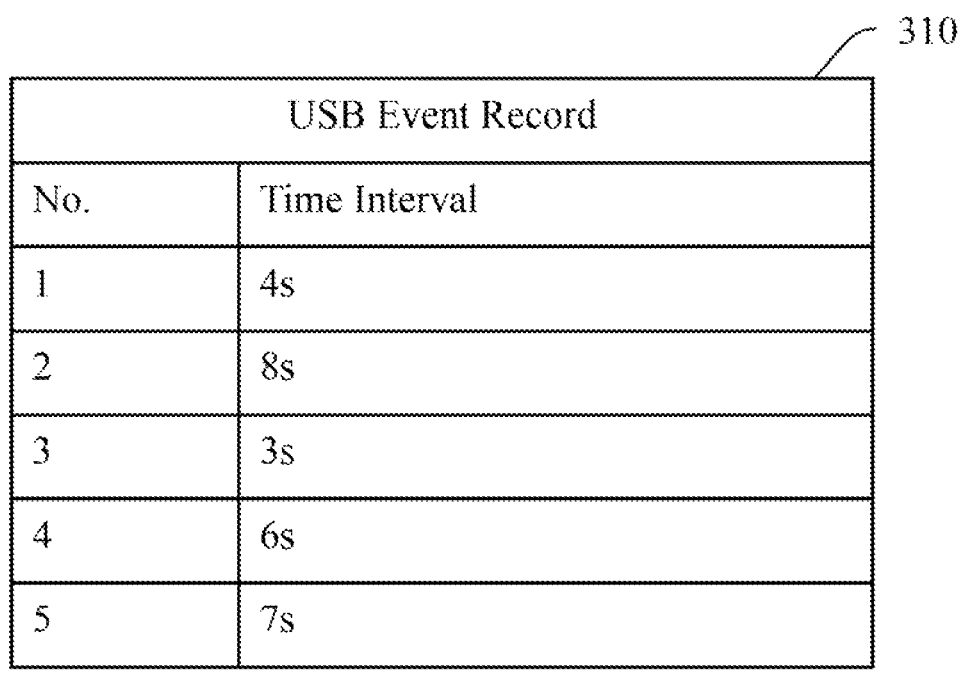
FIG. 3 illustrates a table presenting an example of a sequence of time interval values recorded by a VM host of the computer system of FIG. 1.

The VM host 120 may record a sequence of time interval values, each of which tracks a time interval between two successive USB events. FIG. 3 illustrates a table 310 presenting an example of a sequence of time interval values recorded by the VM host 120. According to the table 310, the VM host 120 detects six USB events and records five time intervals. For example, the time interval between the first and the second detected USB event is 4 seconds, and the time interval between the second and the third detected USB event is 8 seconds.

Figure 4:
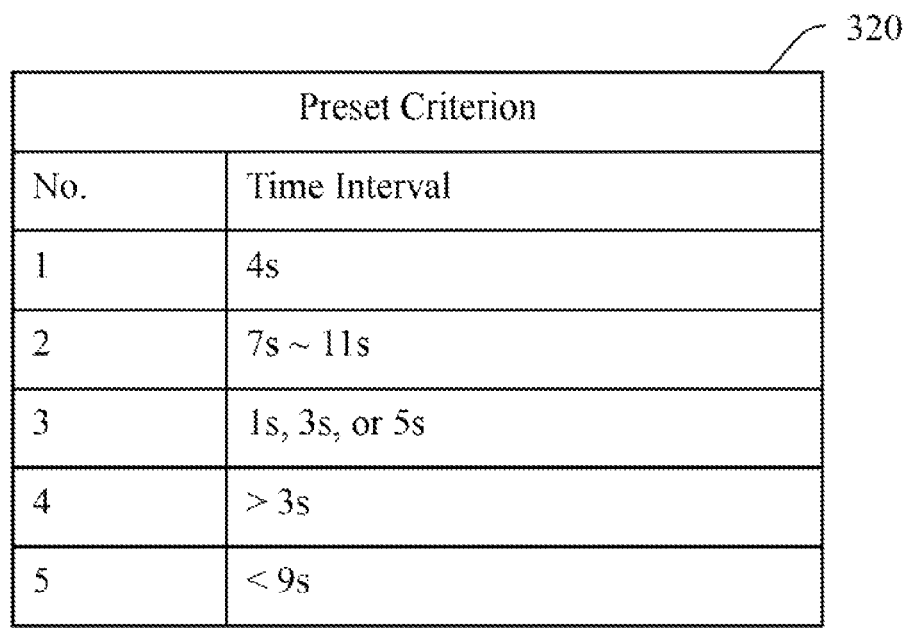
FIG. 4 illustrates a table presenting an example of a first preset criterion of USB events according to one embodiment.

FIG. 4 depicts a table 320 presenting an example of a preset criterion of USB events. The shown preset criterion includes a sequence of time interval value ranges. For example, item #1 states that the first time interval must be equal to 4 seconds and item #2 indicates that the second time interval must be in the range of 7 seconds to 11 seconds. When each of the items of the preset criterion is met, the preset criterion can be determined to be met by the detected USB events.

Using FIG. 3 and FIG. 4 for example, the VM host 120 compares each of the sequence of time interval values shown in FIG. 3 to a corresponding one of the sequence of time interval value ranges shown in FIG. 4. If each of the sequence of time interval values shown in FIG. 3 is in the corresponding value range shown in FIG. 4, the VM host 120 can determine that the preset criterion has been met and the VM guest 130₁ can activate the factory mode. Otherwise, the preset criterion is not met.

In some embodiments, the VM host 120 may only record relevant information about one type of USB events and ignore the other type of USB events. For example, the VM host 120 may only record a sequence of time interval values about USB plug events. In this case, the USB unplug events are ignored by the VM host 120.

Figure 5:
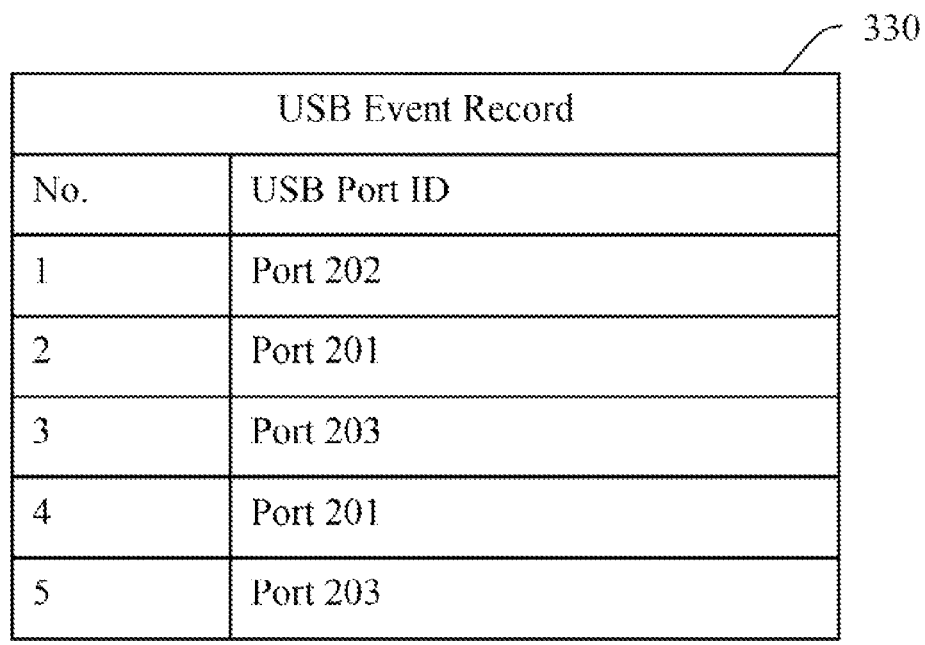
FIG. 5 illustrates a table 330 presenting an example of a sequence of USB port ID values recorded by a VM host of the computer system of FIG. 1.

The VM host 120 may record a sequence of USB port ID values, each of which identifies a USB port where one of the plurality of successive USB events occurs. FIG. 5 illustrated a table 330 presenting an example of a sequence of USB port ID values recorded by the VM host 120. According to the table 330, the VM host 120 detects five USB events and records the corresponding five USB ID values. For example, the first detected USB event occurs on the USB port 202 and the second detected USB event occurs on the USB port 201.

Figure 6:
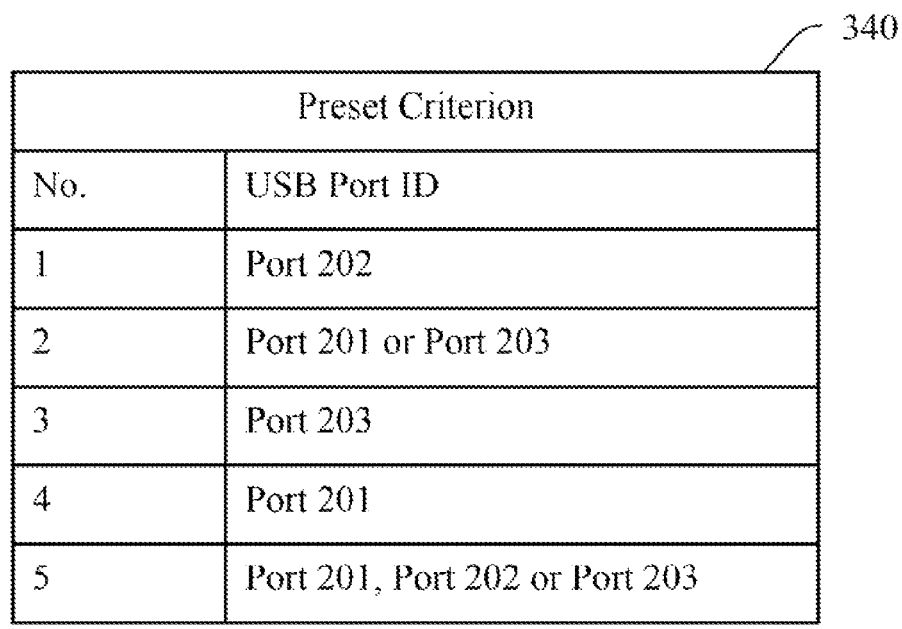
FIG. 6 illustrates a table presenting an example of a second preset criterion of USB events according to one embodiment.

FIG. 6 depicts a table 340 presenting an example of a preset criterion of USB events. The shown preset criterion includes a sequence of USB port ID value ranges. For example, item #1 states that the first USB event must occur on the USB port 202 and item #2 indicates that the second USB event must occur on either the USB 201 or the USB port 203. When each of the items of the preset criterion is met, the preset criterion can be determined to be met by the detected USB events.

Using FIG. 5 and FIG. 6 for example, the VM host 120 compares each of the sequence of USB port ID values shown in FIG. 5 to a corresponding one of the sequence of USB port ID value ranges shown in FIG. 6. If each of the sequence of USB port ID values shown in FIG. 3 is in the corresponding value range shown in FIG. 6, the VM host 120 can determine that the preset criterion has been met, and the VM guest 130₁ can activate the factory mode. Otherwise, the preset criterion is not met.

In some embodiments, the VM host 120 may only record relevant information about one type of USB events and ignore the other type of USB events. For example, the VM host 120 may only record a sequence of USB port ID values about USB plug events. In this case, the USB unplug events are ignored by the VM host 120.

Figure 7:
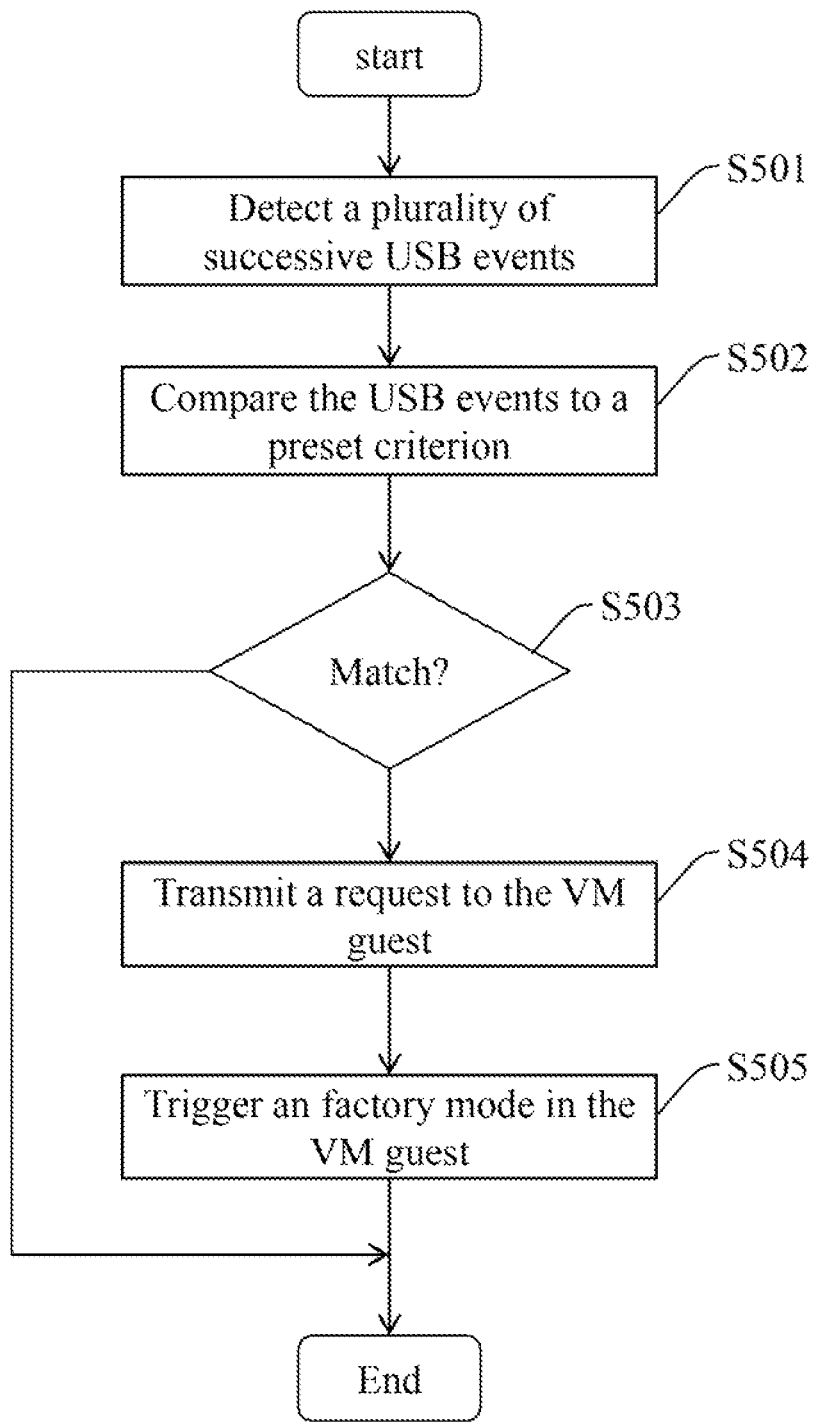
FIG. 7 is an operational flow diagram representing an embodiment of a method of triggering an operation mode of a target VM guest in the computer system of FIG. 1.

FIG. 7 is a flowchart illustrating one embodiment of a method of triggering an operation mode of a target VM guest in the computer system of FIG. 1. The method may include the following steps.

In step S501, the VM host 120 detects a plurality of successive USB events, which occurs on the USB ports of the computer system 100.

In step S502, the VM host 120 compares the plurality of successive USB events to a preset criterion.

In step S503, if the plurality of successive USB events meet the preset criterion, the method continues to step S504, otherwise the method ends.

In step S504, the VM host 120 transmit a request for triggering an operation mode to the VM guest 130₁.

In step S505, the VM guest 130₁ executes a control program for initiating an operation mode of the VM guest 130₁, for example, the factory mode of the VM guest 130₁.

It is to be understood, however, that even though numerous characteristics and advantages have been set forth in the foregoing description of embodiments, together with details of the structures and functions of the embodiments, the disclosure is illustrative only and changes may be made in detail, especially in matters of shape, size, and arrangement of parts within the principles of the disclosure to the full extent indicated by the broad general meaning of the terms in which the appended claims are expressed.

Depending on the embodiment, certain steps or methods described may be removed, others may be added, and the sequence of steps may be altered. It is also to be understood that the description and the claims drawn for or in relation to a method may include some indication in reference to certain steps. However, any indication used is only to be viewed for identification purposes and not as a suggestion as to an order for the steps.

What is claimed is:

1. A method for controlling a computer system, the computer system having a virtual machine (VM) host and a VM guest instantiated on the VM host, the method comprising:
   detecting a plurality of successive universal serial bus (USB) events by the VM host;
   determining whether the plurality of successive USB events meets a preset criterion by the VM host;
   triggering an operation mode by transmitting a request to the VM guest by the VM host if the plurality of successive USB events meets the preset criterion; and
   initiating the operation mode by executing a control program by the VM guest in response to the request.

2. The method of claim 1, wherein the preset criterion comprises a sequence of time interval value ranges, and the step of determining whether the plurality of successive USB events meets the preset criterion comprises:
   recording a sequence of time interval values, each of which tracks a time interval between two successive USB events of the plurality of successive USB events;
   comparing the sequence of time interval values to the sequence of time interval value ranges;
   determining that the plurality of successive USB events meets the preset criterion upon a condition that each of the sequence of time interval values is in a corresponding one of the sequence of time interval value ranges.

3. The method of claim 1, wherein the preset criterion comprises a sequence of USB port identifier (ID) value ranges, and the step of determining whether the plurality of successive USB events meets the preset criterion comprises:
   recording a sequence of USB port ID values, each of which identifies a USB port upon a condition that one of the plurality of successive USB events occurs;
   comparing the sequence of USB port ID values to the sequence of USB port ID value ranges;
   determining that the plurality of successive USB events meets the preset criterion upon a condition that each of the sequence of USB port ID values is in a corresponding one of the sequence of USB port ID value ranges.

4. The method of claim 1, wherein the operation mode is a factory mode to support an operator in at least one of manufacture, test, inspection, or repair of the VM guest.

5. The method of claim 1, further comprising establishing a communication channel between the VM host and the VM guest, wherein the request is transmitted to the VM guest via the communication channel.

6. The method of claim 1, wherein the preset criterion is stored in a storage unit of the computer system.

7. The method of claim 1, wherein the plurality of successive USB events comprises at least one USB plug event and at least one USB unplug event.

8. The method of claim 1, wherein the plurality of successive USB events comprises at least two successive USB plug events.

9. The method of claim 1, wherein the plurality of successive USB events comprises at least two successive USB unplug events.

10. A computer system comprising:
    a virtual machine (VM) host;
    a plurality of VM guests instantiated on the VM host;
    wherein the VM host is adapted to detect a plurality of successive universal serial bus (USB) events, determine whether the plurality of successive USB events meets a preset criterion, and transmit a request for triggering an operation mode to the VM guest upon a condition that the plurality of successive USB events meets the preset criterion, and the VM guest is adapted to execute a control program for initiating the operation mode in response to the request.

11. The computer system of claim 10, wherein the preset criterion comprises a sequence of time interval value ranges, the VM host is adapted to record a sequence of time interval values, each of which tracks a time interval between two successive USB events of the plurality of successive USB events, compare the sequence of time interval values to the sequence of time interval value ranges, and determining that the plurality of successive USB events meets the preset criterion upon a condition that each of the sequence of time interval values is in a corresponding one of the sequence of time interval value ranges.

12. The computer system of claim 10, wherein the preset criterion comprises a sequence of USB port identifier (ID) value ranges, the VM host is adapted to record a sequence of USB port ID values, each of which identifies a USB port upon a condition that one of the plurality of successive USB events occurs, compare the sequence of USB port ID values to the sequence of USB port ID value ranges, and determine that the plurality of successive USB events meets the preset criterion upon a condition that each of the sequence of USB port ID values is in a corresponding one of the sequence of USB port ID value ranges.

13. The computer system of claim 10, wherein the operation mode is a factory mode to support an operator in at least one of manufacture, test, inspection, or repair of the VM guest.

14. The computer system of claim 10, wherein the VM host is further adapted to establish a communication channel between the VM host and the VM guest, and transmit the request to the VM guest via the communication channel.

15. The computer system of claim 10, further comprising a storage unit, wherein the preset criterion is stored in the storage unit.

16. The computer system of claim 10, wherein the plurality of successive USB events comprises at least one USB plug event and at least one USB unplug event.

17. A non-transitory storage medium having stored thereon instructions that, upon a condition that executed by a processor of a computer system, cause the computer system to perform a method, the computer system having a virtual machine (VM) host and a VM guest instantiated on the VM host, the method comprising:
    detecting a plurality of successive USB events by the VM host;
    determining whether the plurality of successive USB events meets a preset criterion by the VM host;
    triggering an operation mode by transmitting a request to the VM guest by the VM host upon a condition that the plurality of successive USB events meets the preset criterion; and
    initiating the operation mode by executing a control program by the VM guest in response to the request.

18. The non-transitory storage medium of claim 17, wherein the preset criterion comprises a sequence of time interval value ranges, and the step of determining whether the plurality of successive USB events meets the preset criterion comprises:
    recording a sequence of time interval values, each of which tracks a time interval between two successive USB events of the plurality of successive USB events;
    comparing the sequence of time interval values to the sequence of time interval value ranges;

determining that the plurality of successive USB events meets the preset criterion upon a condition that each of the sequence of time interval values is in a corresponding one of the sequence of time interval value ranges.

19. The non-transitory storage medium of claim 17, wherein the preset criterion comprises a sequence of USB port identifier (ID) value ranges, and the step of determining whether the plurality of successive USB events meets the preset criterion comprises:

recording a sequence of USB port ID values, each of which identifies a USB port upon a condition that one of the plurality of successive USB events occurs;

comparing the sequence of USB port ID values to the sequence of USB port ID value ranges;

determining that the plurality of successive USB events meets the preset criterion in a case where each of the sequence of USB port ID values is in a corresponding one of the sequence of USB port ID value ranges.

20. The non-transitory storage medium of claim 17, wherein the operation mode is a factory mode to support an operator in at least one of manufacture, test, inspection, or repair of the VM guest.

\* \* \* \* \*